US012699585B2

(12) United States Patent
Bai

(10) Patent No.: US 12,699,585 B2
(45) Date of Patent: Aug. 4, 2026

(54) MEMORY SHARING METHOD AND DEVICE FOR VIRTUAL MACHINES

(71) Applicant: BEIJING HUIJUN TECHNOLOGY CO., LTD., Beijing (CN)

(72) Inventor: Shi Bai, Beijing (CN)

(73) Assignee: BEIJING HUIJUN TECHNOLOGY CO., LTD., Beijing (CN)

( * ) Notice: Subject to any disclaimer, the term of this patent is extended or adjusted under 35 U.S.C. 154(b) by 416 days.

(21) Appl. No.: 18/260,751

(22) PCT Filed: Jan. 5, 2022

(86) PCT No.: PCT/CN2022/070263
§ 371 (c)(1),
(2) Date: Jul. 7, 2023

(87) PCT Pub. No.: WO2022/199206
PCT Pub. Date: Sep. 29, 2022

(65) Prior Publication Data
US 2024/0061701 A1 Feb. 22, 2024

(30) Foreign Application Priority Data
Mar. 26, 2021 (CN) .......................... 202110324549.6

(51) Int. Cl.
G06F 9/455 (2018.01)
(52) U.S. Cl.
CPC .................... *G06F 9/45558* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS 8,266,115 B1 * 9/2012 Park ...................... G06F 16/907
707/749
2011/0214005 A1 * 9/2011 Biran .................... G06F 11/203
718/1

(Continued)

FOREIGN PATENT DOCUMENTS

CN        102103524 A        6/2011
CN        103019884 A        4/2013

(Continued)

OTHER PUBLICATIONS

International Search Report issued in PCT/CN2022/070263, mailed Mar. 14, 2022. (6 pages).

*Primary Examiner* — Mustafa A Amin
(74) *Attorney, Agent, or Firm* — ICE MILLER LLP; Justin D. Swindells

(57) ABSTRACT

A memory sharing method and device for virtual machines. The method includes: monitoring virtual machines in a virtual machine set, and determining homogeneous virtual machines in the virtual machine set, wherein the homogeneous virtual machines are used for representing virtual machines having the same memory pages; migrating virtual machines of which the number of the same memory pages exceeds a preset threshold among the homogeneous virtual machines to a target host machine; and performing memory compression on the homogeneous virtual machines on the target host machine to achieve memory sharing of the homogeneous virtual machines for the same memory pages.

18 Claims, 6 Drawing Sheets

200

(56) References Cited

U.S. PATENT DOCUMENTS

| | | | |
|---|---|---|---|
| 2011/0214122 A1 | 9/2011 | Lublin et al. | |
| 2011/0320556 A1 | 12/2011 | Reuther | |
| 2012/0254860 A1* | 10/2012 | Bozek | G06F 9/461 |
| | | | 718/1 |
| 2015/0301946 A1* | 10/2015 | Guo | G06F 9/45558 |
| | | | 711/6 |
| 2016/0026506 A1 | 1/2016 | Jiang | |
| 2018/0329737 A1 | 11/2018 | Dong et al. | |
| 2019/0104034 A1* | 4/2019 | Myneni | H04L 43/20 |
| 2020/0089784 A1* | 3/2020 | Li | G06F 3/0608 |
| 2020/0233723 A1* | 7/2020 | Jha | G06F 16/906 |

FOREIGN PATENT DOCUMENTS

| | | | |
|---|---|---|---|
| CN | 104050008 A | 9/2014 | |
| CN | 105786585 A | 7/2016 | |
| CN | 108399101 A | 8/2018 | |
| CN | 111651236 A | 9/2020 | |
| CN | 111708653 A | 9/2020 | |
| CN | 113076175 A | 7/2021 | |
| JP | 2017117440 A | 6/2017 | |
| JP | 2020507852 A | 3/2020 | |
| WO | 2018/144377 A1 | 8/2018 | |

* cited by examiner

100

103

102

104

101

105

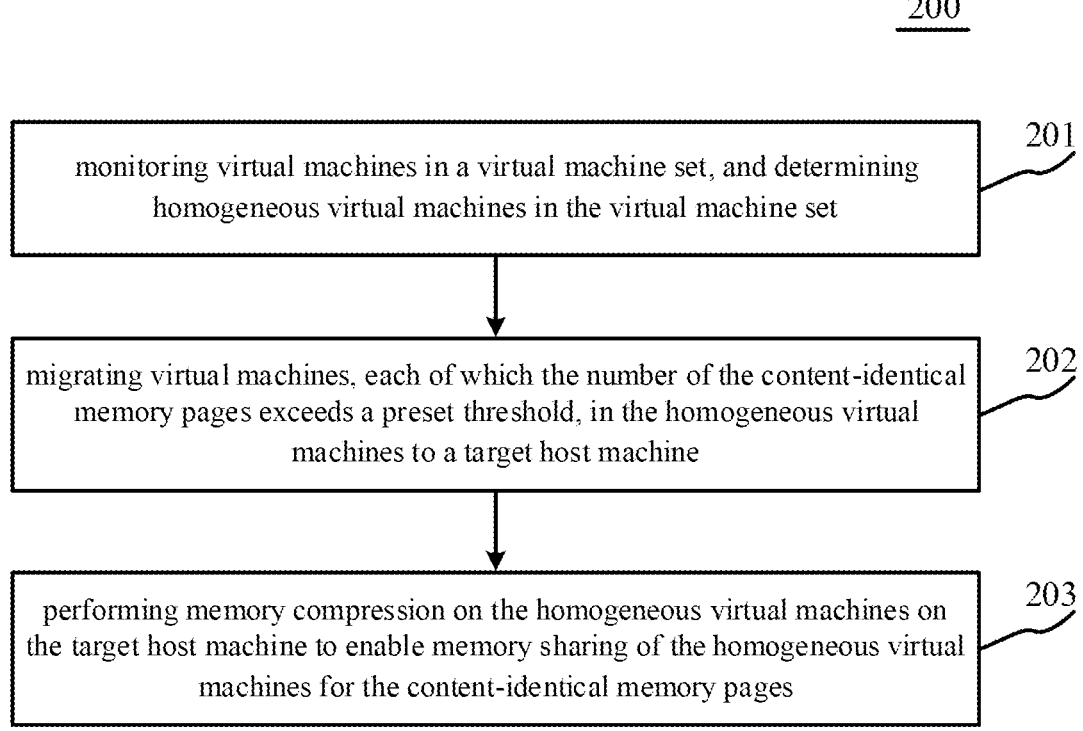

200 monitoring virtual machines in a virtual machine set, and determining homogeneous virtual machines in the virtual machine set

201 migrating virtual machines, each of which the number of the content-identical memory pages exceeds a preset threshold, in the homogeneous virtual machines to a target host machine

202 performing memory compression on the homogeneous virtual machines on the target host machine to enable memory sharing of the homogeneous virtual machines for the content-identical memory pages

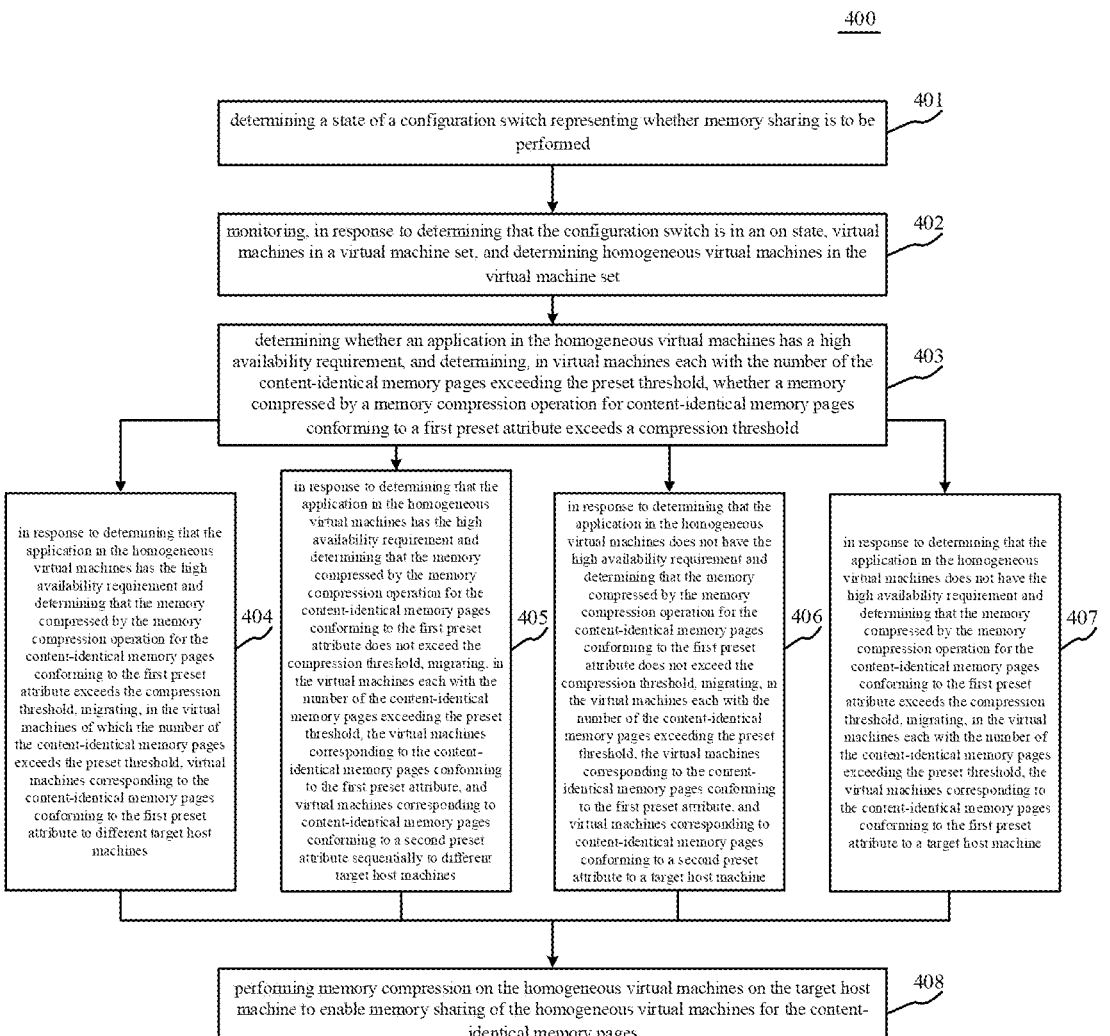

400 determining a state of a configuration switch representing whether memory sharing is to be performed
401 monitoring, in response to determining that the configuration switch is in an on state, virtual machines in a virtual machine set, and determining homogeneous virtual machines in the virtual machine set
402 determining whether an application in the homogeneous virtual machines has a high availability requirement, and determining, in virtual machines each with the number of the content-identical memory pages exceeding the preset threshold, whether a memory compressed by a memory compression operation for content-identical memory pages conforming to a first preset attribute exceeds a compression threshold
403 in response to determining that the application in the homogeneous virtual machines has the high availability requirement and determining that the memory compressed by the memory compression operation for the content-identical memory pages conforming to the first preset attribute exceeds the compression threshold, migrating, in the virtual machines of which the number of the content-identical memory pages exceeds the preset threshold, virtual machines corresponding to the content-identical memory pages conforming to the first preset attribute to different target host machines
404 in response to determining that the application in the homogeneous virtual machines has the high availability requirement and determining that the memory compressed by the memory compression operation for the content-identical memory pages conforming to the first preset attribute does not exceed the compression threshold, migrating, in the virtual machines each with the number of the content-identical memory pages exceeding the preset threshold, the virtual machines corresponding to the content-identical memory pages conforming to the first preset attribute, and virtual machines corresponding to content-identical memory pages conforming to a second preset attribute sequentially to different target host machines
405 in response to determining that the application in the homogeneous virtual machines does not have the high availability requirement and determining that the memory compressed by the memory compression operation for the content-identical memory pages conforming to the first preset attribute does not exceed the compression threshold, migrating, in the virtual machines each with the number of the content-identical memory pages exceeding the preset threshold, the virtual machines corresponding to the content-identical memory pages conforming to the first preset attribute, and virtual machines corresponding to content-identical memory pages conforming to a second preset attribute to a target host machine
406 in response to determining that the application in the homogeneous virtual machines does not have the high availability requirement and determining that the memory compressed by the memory compression operation for the content-identical memory pages conforming to the first preset attribute exceeds the compression threshold, migrating, in the virtual machines each with the number of the content-identical memory pages exceeding the preset threshold, the virtual machines corresponding to the content-identical memory pages conforming to the first preset attribute to a target host machine
407 performing memory compression on the homogeneous virtual machines on the target host machine to enable memory sharing of the homogeneous virtual machines for the content-identical memory pages
408

501 first determining unit

502 migration unit

503 sharing unit

600

MEMORY SHARING METHOD AND DEVICE FOR VIRTUAL MACHINES

CROSS-REFERENCE TO RELATED APPLICATIONS

This patent application is a national stage of International Application No. PCT/CN2022/070263, filed on Jan. 5, 2022, which claims the priority of the Chinese Patent Application filed on Mar. 26, 2021 with the application number 202110324549.6 and the invention titled "MEMORY SHARING METHOD AND DEVICE FOR VIRTUAL MACHINES". Both of the aforementioned applications are hereby incorporated by reference in their entireties.

TECHNICAL FIELD

Embodiments of the present disclosure relate to the field of computer technology, in particular to a method and apparatus for sharing a memory for virtual machines.

BACKGROUND

Virtual machine memory Over-Commit technology is mainly divided into three categories, swapping, ballooning, and page sharing. In an existing page sharing mechanism, KSM (Kernel Samepage Merging) is used to allow the kernel to scan a memory of running a process. If identical memory pages are found, they are merged into a single memory page. If multiple virtual machines are running the same OS (Operating System) or application, and do not update the OS frequently, using KSM can significantly improve a memory usage efficiency and performance.

SUMMARY

Embodiments of the present disclosure propose a method and apparatus for sharing a memory for virtual machines.

An embodiment of the present disclosure provides a method for sharing a memory for virtual machines, including: monitoring virtual machines in a virtual machine set, and determining homogeneous virtual machines in the virtual machine set, wherein the homogeneous virtual machines are used for representing virtual machines having content-identical memory pages; migrating virtual machines each with the number of the content-identical memory pages exceeding a preset threshold in the homogeneous virtual machines to a target host machine; and performing memory compression on the homogeneous virtual machines on the target host machine to enable memory sharing of the homogeneous virtual machines for the content-identical memory pages.

In some embodiments, migrating virtual machines each with the number of the content-identical memory pages exceeding a preset threshold in the homogeneous virtual machines to a target host machine, comprises: determining whether an application in the homogeneous virtual machines has a high availability requirement; and migrating, in response to determining that the application in the homogeneous virtual machines has the high availability requirement, the virtual machines each with the number of the content-identical memory pages exceeding the preset threshold in the homogeneous virtual machines to different target host machines.

In some embodiments, migrating, in response to determining that the application in the homogeneous virtual machines has the high availability requirement, the virtual machines each with the number of the content-identical memory pages exceeding the preset threshold in the homogeneous virtual machines to different target host machines, comprises: determining, in response to determining that the application in the homogeneous virtual machines has the high availability requirement, a high availability level of the high availability requirement; determining a number of target host machines based on the high availability level; and migrating the virtual machines each with the number of the content-identical memory pages exceeding the preset threshold in the homogeneous virtual machines to the determined number of target host machines.

In some embodiments, performing memory compression on the homogeneous virtual machines on the target host machine to enable memory sharing of the homogeneous virtual machines for the content-identical memory pages, comprises: performing the memory compression on homogeneous virtual machines on the same target host machine to enable the memory sharing of the homogeneous virtual machines for the content-identical memory pages.

In some embodiments, migrating virtual machines each with the number of the content-identical memory pages exceeding a preset threshold in the homogeneous virtual machines to a target host machine, comprises: determining, in the virtual machines each with the number of the content-identical memory pages exceeding the preset threshold, whether a memory compressed by a memory compression operation for content-identical memory pages conforming to a first preset attribute exceeds a compression threshold; and in response to determining that the memory compressed by the memory compression operation exceeds the compression threshold, migrating, in the virtual machines each with the number of the content-identical memory pages exceeding the preset threshold, virtual machines corresponding to the content-identical memory pages conforming to the first preset attribute to the target host machine.

In some embodiments, the method further comprises: in response to determining that the memory compressed by the memory compression operation does not exceed the compression threshold, migrating, in the virtual machines each with the number of the content-identical memory pages exceeding the preset threshold, the virtual machines corresponding to the content-identical memory pages conforming to the first preset attribute and virtual machines corresponding to content-identical memory pages conforming to a second preset attribute to the target host machine.

In some embodiments, the monitoring virtual machines in a virtual machine set, and determining homogeneous virtual machines in the virtual machine set, comprises: determining, based on a hash comparing algorithm, the homogeneous virtual machines having the content-identical memory pages in the virtual machine set, and a number of the content-identical memory pages in each homogeneous virtual machine.

In some embodiments, before the monitoring virtual machines in a virtual machine set, and determining homogeneous virtual machines in the virtual machine set, the method further comprises: determining a state of a configuration switch representing whether memory sharing is to be performed; and the monitoring virtual machines in a virtual machine set, and determining homogeneous virtual machines in the virtual machine set, comprises: monitoring, in response to determining that the configuration switch is in an on state, the virtual machines in the virtual machine set, and determining the homogeneous virtual machines in the virtual machine set.

Embodiments of the present disclosure provide an apparatus for sharing a memory for virtual machines, the apparatus comprising: a first determining unit, configured to monitor virtual machines in a virtual machine set, and determine homogeneous virtual machines in the virtual machine set, wherein the homogeneous virtual machines are used for representing virtual machines having content-identical memory pages; a migration unit, configured to migrate virtual machines each with the number of the content-identical memory pages exceeding a preset threshold in the homogeneous virtual machines to a target host machine; and a sharing unit, configured to perform memory compression on the homogeneous virtual machines on the target host machine to enable memory sharing of the homogeneous virtual machines for the content-identical memory pages.

In some embodiments, the migration unit is further configured to: determine whether an application in the homogeneous virtual machines has a high availability requirement; and migrate, in response to determining that the application in the homogeneous virtual machines has the high availability requirement, the virtual machines each with the number of the content-identical memory pages exceeding the preset threshold in the homogeneous virtual machines to different target host machines.

In some embodiments, the migration unit is further configured to: determine, in response to determining that the application in the homogeneous virtual machines has the high availability requirement, a high availability level of the high availability requirement; determine a number of the target host machines based on the high availability level; and migrate the virtual machines each with the number of the content-identical memory pages exceeding the preset threshold in the homogeneous virtual machines to the determined number of target host machines.

In some embodiments, the sharing unit is further configured to: perform the memory compression on homogeneous virtual machines on the same target host machine to enable the memory sharing of the homogeneous virtual machines for the content-identical memory pages.

In some embodiments, the migration unit is further configured to: determine, in the virtual machines each with the number of the content-identical memory pages exceeding the preset threshold, whether a memory compressed by a memory compression operation for content-identical memory pages conforming to a first preset attribute exceeds a compression threshold; and in response to determining that the memory compressed by the memory compression operation exceeds the compression threshold, migrate, in the virtual machines each with the number of the content-identical memory pages exceeding the preset threshold, virtual machines corresponding to the content-identical memory pages conforming to the first preset attribute to the target host machine.

In some embodiments, the migration unit is further configured to: in response to determining that the memory compressed by the memory compression operation does not exceed the compression threshold, migrate, in the virtual machines each with the number of the content-identical memory pages exceeding the preset threshold, the virtual machines corresponding to the content-identical memory pages conforming to the first preset attribute and virtual machines corresponding to content-identical memory pages conforming to a second preset attribute to the target host machine.

In some embodiments, the first determining unit is further configured to: determine, based on a hash comparing algorithm, the homogeneous virtual machines having the content-identical memory pages in the virtual machine set, and a number of the content-identical memory pages in each homogeneous virtual machine.

In some embodiments, the apparatus further comprises: a second determining unit, configured to determine a state of a configuration switch representing whether memory sharing is to be performed; and the first determining unit is further configured to: monitor, in response to determining that the configuration switch is in an on state, the virtual machines in the virtual machine set, and determine the homogeneous virtual machines in the virtual machine set.

Embodiments of the present disclosure provide a computer readable storage medium storing computer instructions, where, the computer instructions are used to cause the computer to perform the method as described above.

Embodiments of the present disclosure provide an electronic device, including: at least one processor; and a memory communicatively connected to the at least one processor; where, the memory stores instructions executable by the at least one processor, and the instructions, when executed by the at least one processor, cause the at least one processor to perform the method as described above.

BRIEF DESCRIPTION OF THE DRAWINGS

Other features, objectives and advantages of the present disclosure will become more apparent by reading detailed descriptions of non-limiting embodiments made with reference to the following accompanying drawings:

FIG. 2 is a flowchart of an embodiment of a method for sharing a memory for virtual machines according to the present disclosure;

FIG. 4 is a flowchart of another embodiment of the method for sharing a memory for virtual machines according to the present disclosure;

DETAILED DESCRIPTION OF EMBODIMENTS

The present disclosure will be further described in detail below with reference to the accompanying drawings and embodiments. It may be understood that the specific embodiments described herein are only used to explain the related disclosure, but not to limit the disclosure. In addition, it should also be noted that, for ease of description, only parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
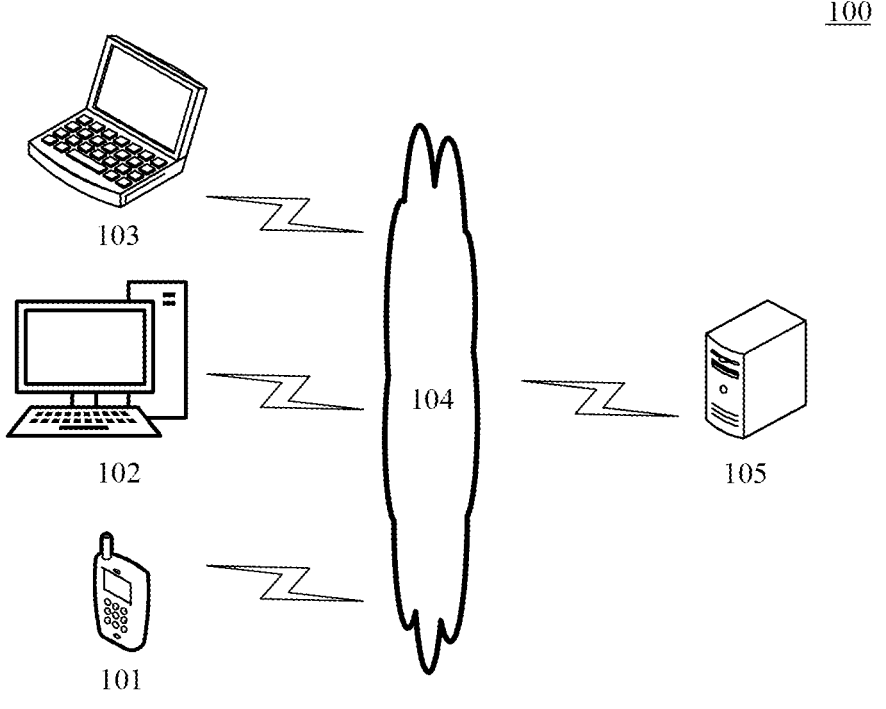
FIG. 1 is an exemplary system architecture diagram to which an embodiment of the present disclosure may be applied.

FIG. 1 illustrates an exemplary architecture 100 to which a method and apparatus for sharing a memory for virtual machines of the present disclosure may be applied.

As shown in FIG. 1, the system architecture 100 may include terminal devices 101, 102, 103, a network 104 and a server 105. The terminal devices 101, 102, 103 are communicatively connected with each to form a topology network. The network 104 serves as a medium for providing a communication link between the terminal devices 101, 102, 103 and the server 105. The network 104 may include various types of connections, such as wired or wireless communication links, or optical fiber cables.

The terminal devices 101, 102, 103 may be hardware devices or software that support network connectivity and thus data interaction and data processing. When the terminal devices 101, 102, 103 are hardware, they may be a variety of electronic devices that support network connectivity, information acquisition, interaction, display, processing and other functions, including but not limited to smartphones, tablet computers, e-book readers, laptops computers, desktop computers, or the like. When the terminal devices 101, 102, 103 are software, they may be installed in the electronic devices listed above. They may be implemented as a plurality of software or software modules (e.g., for providing distributed services), or as a single software or software module, which is not limited herein.

The server 105 may serve as a host machine for deploying virtual machines to provide various services, such as a backend processing server that acquires operation information sent by users through the terminal devices 101, 102, 103 and processes the information based on operation requests. The server 105 may also determine homogeneous virtual machines in a virtual machine set, and perform memory compression on the homogeneous virtual machines to enable memory sharing among the homogeneous virtual machines. As an example, the server 105 may be a cloud server.

It should be noted that the server may be hardware or software. When the server is hardware, it may be implemented as a distributed server cluster composed of a plurality of servers, or as a single server. When the server is software, it may be implemented as a plurality of software or software modules (e.g., software or software modules for providing distributed services), or as a single software or software module, which is not limited herein.

It should also be noted that the method for sharing a memory for virtual machines provided by embodiments of the present disclosure may be performed by the server, or by the terminal devices, or by the server and the terminal devices in cooperation with each other. Accordingly, parts (e.g., units) included in the apparatus for sharing a memory for virtual machines may be provided all in the server, or all in the terminal devices, or may be provided in the server and the terminal devices, respectively.

It should be understood that the numbers of terminal devices, networks and servers in FIG. 1 are only illustrative. According to the implementation needs, there may be any number of terminal devices, networks and servers. When an electronic device on which the method for sharing a memory for virtual machines runs does not require data transmission with other electronic devices, the system architecture may include only the electronic device on which the method for sharing a memory for virtual machines runs (e.g., the server or the terminal devices).

With further reference to FIG. 2, illustrating a flow 200 of an embodiment of a method for sharing a memory for virtual machines, the method includes the following steps 201 to 203.

Step 201, monitoring virtual machines in a virtual machine set, and determining homogeneous virtual machines in the virtual machine set.

In the present embodiment, an executing body of the method for sharing a memory for virtual machines (e.g., the server in FIG. 1) may monitor the virtual machines in the virtual machine set and determine the homogeneous virtual machines in the virtual machine set. Here, the homogeneous virtual machines are used for representing virtual machines having content-identical memory pages.

The virtual machine set includes all virtual machines that require memory compression to enable memory sharing. During running of the virtual machines, memories are managed in a unit of a memory page. When a content-identical memory page exists in different virtual machines, these virtual machines may be considered as homogeneous virtual machines.

For a cloud platform scenario where there are massive virtual machines are running, the executing body may use all the virtual machines running on the cloud platform as the virtual machine set and monitor the same.

As an example, the executing body may monitor virtual machines running and created on the cloud platform, focusing on identifying and recording virtual machines centrally created and configured by a preset tenant within a preset time range, and record acquired monitoring information in a metadata management module. It may be understood that virtual machines that are centrally created within a similar time frame are more likely to be homogeneous virtual machines.

In some alternative implementations of the present embodiment, the executing body may determine, based on a hash compare algorithm, the homogeneous virtual machines having the content-identical memory pages in the virtual machine set, and the number of the content-identical memory pages in the homogeneous virtual machines.

As an example, the executing body may obtain a hash coding by performing hash operation on each memory page in the virtual machines in the virtual machine set using the same hash function, and determine memory pages of the same hash coding as the content-identical memory pages. Further, the executing body may determine the homogeneous virtual machines in the virtual machine set, and the number of the content-identical memory pages in each homogeneous virtual machine.

Step 202, migrating virtual machines, each of which the number of the content-identical memory pages exceeds a preset threshold, in the homogeneous virtual machines to a target host machine.

In the present embodiment, the executing body may migrate the virtual machines, each of which the number of the content-identical memory pages exceeds the preset threshold, in the homogeneous virtual machines to a target host machine to the target host machine.

Here, the preset threshold may be set according to actual situations and is not limited herein. As an example, the preset threshold is 5.

The executing body migrates the homogeneous virtual machines, each of which the number of the content-identical memory pages exceeds the preset threshold, to the target host machine, to perform memory compression and sharing among the migrated homogeneous virtual machines through subsequent steps. It should be noted that, at present, virtual machine migration is a relatively mature technology, and detailed description thereof will be omitted.

In some alternative implementations of the present embodiment, the executing body may perform the above step 202 by:

First, determining whether an application in the homogeneous virtual machines has a high availability requirement.

High availability represents reducing a time length in which a system cannot provide services by design. A principle of ensuring high availability is "redundancy". By means of redundant backup, a problem of non-high availability of a single point system can be avoided.

In this implementation, the executing body may determine whether the application in the homogeneous virtual machines has the high availability requirement.

Secondly, migrating, in response to determining that the application in the homogeneous virtual machines has the high availability requirement, the virtual machines, each of which the number of the content-identical memory pages exceeds the preset threshold, in the homogeneous virtual machines to different target host machine.

In this implementation, the homogeneous virtual machines, each of which the number of the content-identical memory pages exceeds the preset threshold, are migrated to the different target host machines for backup, to meet the high availability requirement of the application in these homogeneous virtual machines.

In some alternative implementations of the present embodiment, the executing body may perform the above second step by:

First, determining, in response to determining that the application in the homogeneous virtual machines has the high availability requirement, a high availability level of the high availability requirement.

As an example, the high availability level may be pre-graded, and grading information may be correlated with the number of the target host machines. For example, the high availability level includes a high level, a medium level, and a low level, sequentially corresponding to the number of the target host machines of 3, 2, and 1.

Secondly, determining the number of the target host machines based on the high availability level.

Finally, migrating the virtual machines, each of which the number of the content-identical memory pages exceeds the preset threshold, in the homogeneous virtual machines to the determined number of the target host machines.

In this implementation, the executing body may flexibly determine the number of virtual machines on the respective target host machines. As an example, the executing body may migrate the homogeneous virtual machines to the target host machines of the above number based on an average number.

In some alternative implementations of the present embodiment, the executing body may perform the above step 202 by:

First, determining, in the virtual machines each with the number of the content-identical memory pages exceeding the preset threshold, whether a memory compressed by a memory compression operation for content-identical memory pages conforming to a first preset attribute exceeds a compression threshold.

In this implementation, the executing body may first predict whether the memory compressed by the memory compression operation exceeds the compression threshold before migrating the homogeneous virtual machines. Here, the memory compression operation is a memory compression operation performed on the content-identical memory pages conforming to the first preset attribute. The first preset attribute may be, for example, a readable attribute.

The compression threshold represents a minimum expected value for memory compression, which may be set according to the actual situations and is not limited herein.

Secondly, in response to determining that the memory compressed by the memory compression operation exceeds the compression threshold, migrating, in the virtual machines each with the number of the content-identical memory pages exceeding the preset threshold, virtual machines corresponding to the content-identical memory pages conforming to the first preset attribute to the target host machine.

In this implementation, when the memory compressed by the memory compression operation for the content-identical memory pages conforming to the first preset attribute is sufficient to meet the compression threshold, the executing body may only migrate the virtual machines corresponding to the content-identical memory pages conforming to the first preset attribute to the target host machine, in the virtual machines each with the number of the content-identical memory pages exceeding the preset threshold.

In some alternative implementations of the present embodiment, in response to determining that the memory compressed by the memory compression operation does not exceed the compression threshold, the executing body may migrate, in the virtual machines each with the number of the content-identical memory pages exceeding the preset threshold, the virtual machines corresponding to the content-identical memory pages conforming to the first preset attribute, and virtual machines corresponding to content-identical memory pages conforming to a second preset attribute to the target host machine. Here, the second preset attribute may be, for example, a writable attribute.

In this implementation, for the content-identical memory pages of the first preset attribute, and those of the second preset attribute, the executing body may perform two-level compression through a subsequent step 203 to meet compression needs represented by the compression threshold.

It should be noted that the above implementations may be combined with each other to obtain new implementations. As an example, the executing body may perform the above step 202 by: determining, in the virtual machines each with the number of the content-identical memory pages exceeding the preset threshold, whether a memory compressed by a memory compression operation for content-identical memory pages conforming to a first preset attribute exceeds a compression threshold; determining whether an application in the homogeneous virtual machines has a high availability requirement; and in response to determining that the application in the homogeneous virtual machines has the high availability requirement and determining that the memory compressed by the memory compression operation for the content-identical memory pages conforming to the first preset attribute exceeds the compression threshold, migrating, in the virtual machines each with the number of the content-identical memory pages exceeding the preset threshold, virtual machines corresponding to the content-identical memory pages conforming to the first preset attribute to different target host machines.

Step 203, performing memory compression on the homogeneous virtual machines on the target host machine to enable memory sharing of the homogeneous virtual machines for the content-identical memory pages.

In the present embodiment, the executing body may perform memory compression on the homogeneous virtual machines on the target host machine to enable the memory sharing of the homogeneous virtual machines for the content-identical memory pages.

As an example, for each type of the content-identical memory pages, the executing body may merge these content-identical memory pages into a single memory page in a plurality of virtual machines including the content-identical memory pages through KSM technology, and share the merged memory page in the plurality of virtual machines including the content-identical memory pages.

In some alternative implementations of the present embodiment, in the case where the application in the homogeneous virtual machines has the high availability requirement, the executing body may perform memory compression on the homogeneous virtual machines on the same target host machine to enable memory sharing of the homogeneous virtual machines for the content-identical memory pages.

Figure 3:
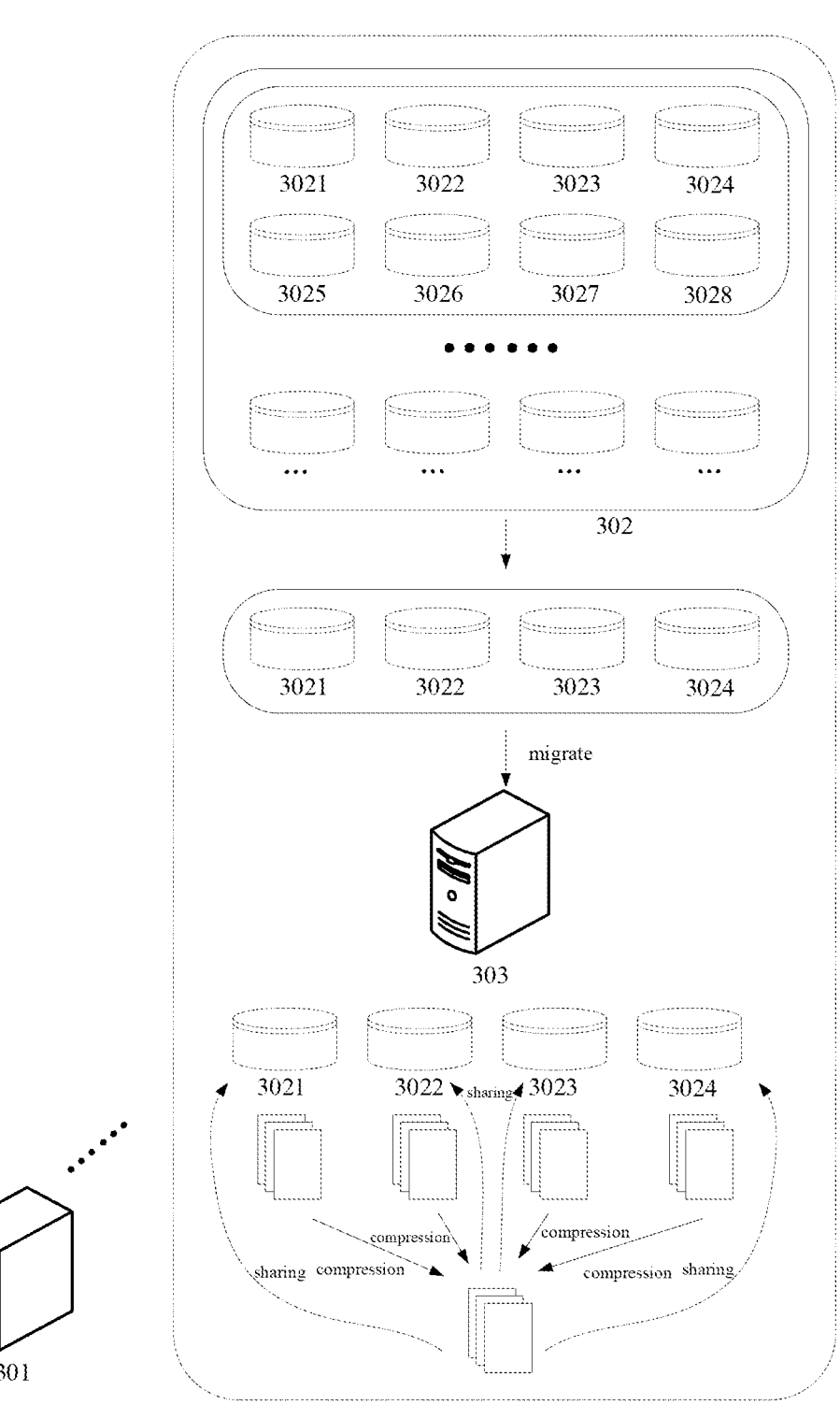
FIG. 3 is a schematic diagram of an application scenario of the method for sharing a memory for virtual machines according to an embodiment of the present disclosure.

With further reference to FIG. 3, FIG. 3 is a schematic diagram 300 of an application scenario of the method for sharing a memory for virtual machines according to the present embodiment. In the application scenario of FIG. 3, a server 301 monitors virtual machines in a virtual machine set 302 and determines that the virtual machine set 302 includes homogeneous virtual machines of virtual machines 3021, 3022, 3023, 3024, 3025, 3026, 3027, 3028. Here, the homogeneous virtual machines are used for representing virtual machines having content-identical memory pages. After determining the homogeneous virtual machines in the virtual machine set, virtual machines 3021, 3022, 3023, 3024 each with the number of the content-identical memory pages exceeding a preset threshold in the homogeneous virtual machines are migrated to a target host machine 303. Further, memory compression is performed on the homogeneous virtual machines 3021, 3022, 3023, 3024 on the target host machine 303 to enable memory sharing of the homogeneous virtual machines for the content-identical memory pages.

The method provided by the above embodiment of the present disclosure, by monitoring virtual machines in a virtual machine set, and determining homogeneous virtual machines in the virtual machine set, where the homogeneous virtual machines are used for representing virtual machines having content-identical memory pages; migrating virtual machines each with the number of the content-identical memory pages exceeding the preset threshold in the homogeneous virtual machines to a target host machine; and performing memory compression on the homogeneous virtual machines on the target host machine to enable memory sharing of the homogeneous virtual machines for the content-identical memory pages, a method for sharing a memory for virtual machines that guarantees more efficient running of the system while reducing resource running costs is provided.

In some alternative implementations of the present embodiment, before performing the above step 201, the executing subject may first determine a state of a configuration switch representing whether memory sharing is to be performed. The executing body may perform the above step 201 by: monitoring, in response to determining that the configuration switch is in an on state, the virtual machines in the virtual machine set, and determining the homogeneous virtual machines in the virtual machine set.

As an example, in the e-commerce field, a surge in consumption of goods during promotions on an e-commerce platform is a greater challenge for the operation of shopping platforms. In this regard, the configuration switch may be turned on to perform the memory sharing scheme represented by the above steps to provide a high-efficient operating platform.

With further reference to FIG. 4, illustrating a schematic flow 400 of an embodiment of the method for sharing a memory for virtual machines according to the present disclosure, the method includes the following steps 401 to 408.

Step 401, determining a state of a configuration switch representing whether memory sharing is to be performed.

Step 402, monitoring, in response to determining that the configuration switch is in an on state, virtual machines in a virtual machine set, and determining homogeneous virtual machines in the virtual machine set.

Here, the homogeneous virtual machines are used for representing virtual machines having content-identical memory pages.

Step 403, determining whether an application in the homogeneous virtual machines has a high availability requirement, and determining, in virtual machines each with the number of the content-identical memory pages exceeding the preset threshold, whether a memory compressed by a memory compression operation for content-identical memory pages conforming to a first preset attribute exceeds a compression threshold.

Step 404, in response to determining that the application in the homogeneous virtual machines has the high availability requirement and determining that the memory compressed by the memory compression operation for the content-identical memory pages conforming to the first preset attribute exceeds the compression threshold, migrating, in the virtual machines of which the number of the content-identical memory pages exceeds the preset threshold, virtual machines corresponding to the content-identical memory pages conforming to the first preset attribute to different target host machines.

Step 405, in response to determining that the application in the homogeneous virtual machines has the high availability requirement and determining that the memory compressed by the memory compression operation for the content-identical memory pages conforming to the first preset attribute does not exceed the compression threshold, migrating, in the virtual machines each with the number of the content-identical memory pages exceeding the preset threshold, the virtual machines corresponding to the content-identical memory pages conforming to the first preset attribute, and virtual machines corresponding to content-identical memory pages conforming to a second preset attribute sequentially to different target host machines.

Step 406, in response to determining that the application in the homogeneous virtual machines does not have the high availability requirement and determining that the memory compressed by the memory compression operation for the content-identical memory pages conforming to the first preset attribute does not exceed the compression threshold, migrating, in the virtual machines each with the number of the content-identical memory pages exceeding the preset threshold, the virtual machines corresponding to the content-identical memory pages conforming to the first preset attribute, and virtual machines corresponding to content-identical memory pages conforming to a second preset attribute to a target host machine.

Step 407, in response to determining that the application in the homogeneous virtual machines does not have the high availability requirement and determining that the memory compressed by the memory compression operation for the content-identical memory pages conforming to the first preset attribute exceeds the compression threshold, migrating, in the virtual machines each with the number of the content-identical memory pages exceeding the preset threshold, the virtual machines corresponding to the content-identical memory pages conforming to the first preset attribute to a target host machine.

Step 408, performing memory compression on the homogeneous virtual machines on the target host machine to enable memory sharing of the homogeneous virtual machines for the content-identical memory pages.

As can be seen from the present embodiment, compared to the corresponding embodiment in FIG. 2, the flow 400 of the method for sharing a memory for virtual machines in the present embodiment describes in detail the process of determining a configuration switch, and the process of migrating homogeneous virtual machines. The combination of a high availability policy and a shared memory mechanism guarantees a certain compression rate of the system's memory and ensures a high availability property of upper-level business applications.

Figure 5:
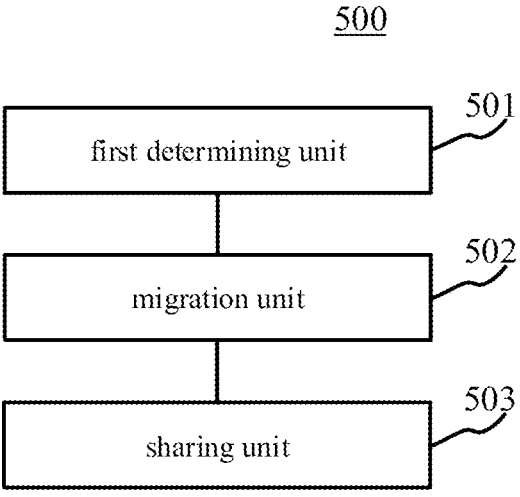
FIG. 5 is a structural diagram of an embodiment of an apparatus for sharing a memory for virtual machines according to the present disclosure.

With further reference to FIG. 5, as an implementation of the method shown in the above figures, the present disclosure provides an embodiment of an apparatus for sharing a memory for virtual machines. The embodiment of the apparatus corresponds to the embodiment of the method shown in FIG. 2. The apparatus may be applied to various electronic devices.

As shown in FIG. 5, the apparatus for sharing a memory for virtual machines includes: a first determining unit 501, configured to monitor virtual machines in a virtual machine set, and determine homogeneous virtual machines in the virtual machine set, where the homogeneous virtual machines are used for representing virtual machines having content-identical memory pages; a migration unit 502, configured to migrate virtual machines each with the number of the content-identical memory pages exceeding a preset threshold in the homogeneous virtual machines to a target host machine; and a sharing unit 503, configured to perform memory compression on the homogeneous virtual machines on the target host machine to enable memory sharing of the homogeneous virtual machines for the content-identical memory pages.

In some alternative implementations of the present embodiment, the migration unit 502 is further configured to: determine whether an application in the homogeneous virtual machines has a high availability requirement; and migrate, in response to determining that the application in the homogeneous virtual machines has the high availability requirement, the virtual machines each with the number of the content-identical memory pages exceeding the preset threshold in the homogeneous virtual machines to different target host machines.

In some alternative implementations of the present embodiment, the migration unit 502 is further configured to: determine, in response to determining that the application in the homogeneous virtual machines has the high availability requirement, a high availability level of the high availability requirement; determine a number of the target host machines based on the high availability level; and migrate the virtual machines each with the number of the content-identical memory pages exceeding the preset threshold in the homogeneous virtual machines to the determined number of target host machines.

In some alternative implementations of the present embodiment, the sharing unit 503 is further configured to: perform the memory compression on homogeneous virtual machines on the same target host machine to enable the memory sharing of the homogeneous virtual machines for the content-identical memory pages.

In some alternative implementations of the present embodiment, the migration unit 502 is further configured to: determine, in the virtual machines each with the number of the content-identical memory pages exceeding the preset threshold, whether a memory compressed by a memory compression operation for content-identical memory pages conforming to a first preset attribute exceeds a compression threshold; and in response to determining that the memory compressed by the memory compression operation exceeds the compression threshold, migrate, in the virtual machines each with the number of the content-identical memory pages exceeding the preset threshold, virtual machines corresponding to the content-identical memory pages conforming to the first preset attribute to the target host machine.

In some alternative implementations of the present embodiment, the migration unit 502 is further configured to: in response to determining that the memory compressed by the memory compression operation does not exceed the compression threshold, migrate, in the virtual machines each with the number of the content-identical memory pages exceeding the preset threshold, the virtual machines corresponding to the content-identical memory pages conforming to the first preset attribute and virtual machines corresponding to content-identical memory pages conforming to a second preset attribute to the target host machine.

In some alternative implementations of the present embodiment, the first determining unit 501 is further configured to: determine, based on a hash comparing algorithm, the homogeneous virtual machines having the content-identical memory pages in the virtual machine set, and a number of the content-identical memory pages in each homogeneous virtual machine.

In some alternative implementations of the present embodiment, the apparatus further includes: a second determining unit (not shown in the figure), configured to determine a state of a configuration switch representing whether memory sharing is to be performed; and the first determining unit 501 is further configured to: monitor, in response to determining that the configuration switch is in an on state, the virtual machines in the virtual machine set, and determine the homogeneous virtual machines in the virtual machine set.

In the present embodiment, the first determining unit in the apparatus for sharing a memory for virtual machines monitors virtual machines in a virtual machine set, and determines homogeneous virtual machines in the virtual machine set, where the homogeneous virtual machines are used for representing virtual machines having content-identical memory pages; the migration unit migrates virtual machines each with the number of the content-identical memory pages exceeding a preset threshold in the homogeneous virtual machines to a target host machine; and the sharing unit performs memory compression on the homogeneous virtual machines on the target host machine to enable memory sharing of the homogeneous virtual machines for the content-identical memory pages, thereby providing an apparatus for sharing a memory for virtual machines that guarantees more efficient running of the system while reducing resource running costs.

Figure 6:
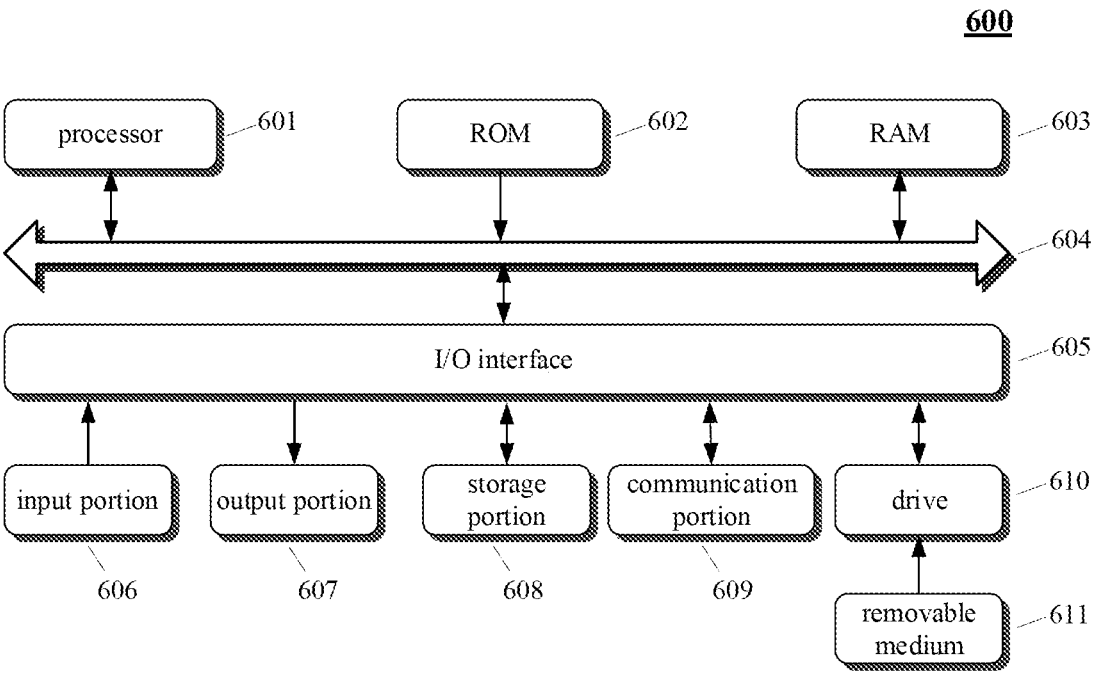
FIG. 6 is a schematic structural diagram of a computer system suitable for implementing embodiments of the present disclosure.

Next referring to FIG. 6, illustrating a schematic structural diagram of a computer system 600 suitable for implementing a device (e.g., devices 101, 102, 103, 105 shown in FIG. 1) of embodiments of the present disclosure. The device illustrated in FIG. 6 is only an example and shall not impose any limitation on the functionality and scope of use of the embodiments of the present disclosure.

As shown in FIG. 6, the computer system 600 includes: a processor (e.g., CPU, central processing unit) 601, which may perform various appropriate actions and processing, based on a program stored in a read-only memory (ROM) 602 or a program loaded from a storage portion 608 into a random access memory (RAM) 603. In the RAM 603, various programs and data required for the operation of the system 600 may also be stored. The processor 601, the ROM 602, and the RAM 603 are connected to each other through a bus 604. An input/output (I/O) interface 605 is also connected to the bus 604.

The following components are connected to the I/O interface 605, including: an input portion 606 including a keyboard, a mouse, etc.; an output portion 607 including, for example, a cathode ray tube (CRT), a liquid crystal display (LCD), etc. and a speaker, etc.; the storage portion 608 including a hard disk, etc.; and a communication portion 609 including a network interface card such as a LAN card, a modem. The communication portion 609 performs communication processing via a network such as the Internet. The communication portion 609 performs communication processing via a network such as the Internet. A drive 610 is also connected to the I/O interface 605 as needed. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the processor 601, implements the above mentioned functionalities as defined by the method of the present disclosure.

It should be noted that the computer readable medium in the present disclosure can be a computer readable signal medium, a computer readable storage medium, or any combination of the above two. Computer readable storage media can be, for example, but not limited to, systems, devices or devices of electricity, magnetism, light, electro-magnetism, infrared, or semiconductors, or any combination of the above. More specific examples of computer-readable storage media may include, but are not limited to: electrical connections with one or more wires, portable computer disks, hard drives, random access memory (RAM), read-only memory (ROM), erasable programmable read-only memory (EPROM or flash memory), optical fibers, portable compact disk read-only memory (CD-ROM), optical storage devices, magnetic storage devices Or any suitable combination of the above. In the present disclosure, the computer-readable storage medium may be any tangible medium containing or storing a program, which can be used by or in combination with an instruction execution system, device, or device. In the present disclosure, the computer-readable signal medium may include data signals propagated in the baseband or as part of the carrier wave, which carries computer-readable program code. This propagation of data signals can take various forms, including but not limited to electromagnetic signals, optical signals, or any suitable combination of the above. A computer-readable signal medium can also be any computer-readable medium other than a computer-readable storage medium, which can send, propagate, or transmit programs used by or in combination with instruction execution systems, devices, or devices. The program code contained on computer readable media can be transmitted using any suitable medium, including but not limited to: wireless, wire, fiber optic cable, RF, etc., or any suitable combination of the above.

Computer program code for executing the operations of the present application may be written in one or more programming languages or combinations thereof, including object-oriented programming languages such as Java, Smalltalk, C++, and conventional procedural programming languages such as "C" or similar programming languages. Program code can be completely executed on the client computer, partially executed on the client computer, executed as a standalone software package, partially executed on the client computer, partially executed on the remote computer, or completely executed on the remote computer or server. In cases involving remote computers, the remote computer can connect to the client computer through any type of network, including a local area network (LAN) or wide area network (WAN), or can connect to external computers (such as using an Internet service provider to connect through the Internet).

The flowchart and block diagram in the accompanying drawings illustrate the possible architecture, functions, and operations of the devices, methods, and computer program products according to various embodiments of the present disclosure. At this point, each block in a flowchart or block diagram can represent a module, program segment, or part of code that contains one or more executable instructions for implementing specified logical functions. It should also be noted that in some alternative implementations, the functions indicated in the blocks can also occur in a different order than those indicated in the accompanying drawings. For example, two consecutive blocks can actually be executed in parallel, and sometimes they can also be executed in the opposite order, depending on the function involved. It should also be noted that each block in the block diagram and/or flowchart, as well as the combination of blocks in the block diagram and/or flowchart, can be implemented using dedicated hardware based systems that perform specified functions or operations, or can be implemented using a combination of dedicated hardware and computer instructions.

The units involved in the embodiments of the present disclosure may be implemented by means of software or hardware. The described units may also be provided in a processor, for example, may be described as: a processor including a first determining unit, a migration unit and a sharing unit. Here, the names of these units do not in some cases constitute limitations to such units themselves. For example, the sharing unit may also be described as "a unit configured to perform memory compression on the homogeneous virtual machines on the target host machine to enable memory sharing of the homogeneous virtual machines for the content-identical memory pages".

In another aspect, the present disclosure further provides a computer readable medium. The computer readable medium may be included in the device in the above described embodiments, or a stand-alone computer readable medium not assembled into the device. The computer readable medium carries one or more programs. The one or more programs, when executed by the apparatus, cause the electronic device to: monitor virtual machines in a virtual machine set, and determine homogeneous virtual machines in the virtual machine set, where the homogeneous virtual machines are used for representing virtual machines having content-identical memory pages; migrate virtual machines each with the number of the content-identical memory pages exceeding a preset threshold in the homogeneous virtual machines to a target host machine; and perform memory compression on the homogeneous virtual machines on the target host machine to enable memory sharing of the homogeneous virtual machines for the content-identical memory pages.

The above description is only a preferred embodiment of the present disclosure and an explanation of the technical principles used. Those skilled in the art should understand that the scope of the invention referred to in the present disclosure is not limited to technical solutions formed by specific combinations of the above technical features, but also covers other technical solutions formed by arbitrary combinations of the above technical features or their equivalent features without departing from the above invention concept. For example, the technical solution formed by replacing the above features with (but not limited to) technical features with similar functions disclosed in the present disclosure.

The invention claimed is:

1. A method for sharing a memory for virtual machines, the method comprising:

monitoring virtual machines in a virtual machine set, and determining homogeneous virtual machines in the virtual machine set, wherein the homogeneous virtual machines are used for representing virtual machines having content-identical memory pages;

migrating virtual machines each with a number of the content-identical memory pages exceeding a preset threshold in the homogeneous virtual machines to a target host machine, comprising:

determining, in the virtual machines each with the number of the content-identical memory pages exceeding the preset threshold, whether a memory compressed by a memory compression operation for content-identical memory pages conforming to a first preset attribute exceeds a compression threshold, wherein the compression threshold represents a minimum expected value for memory compression; and in response to determining that the memory compressed by the memory compression operation exceeds the compression threshold, migrating, from among the virtual machines each with the number of the content-identical memory pages exceeding the preset threshold, virtual machines corresponding to the content-identical memory pages conforming to the first preset attribute to the target host machine; and performing memory compression on the homogeneous virtual machines on the target host machine to enable memory sharing of the homogeneous virtual machines for the content-identical memory pages.

2. The method according to claim 1, wherein migrating virtual machines each with the number of the content-identical memory pages exceeding a preset threshold in the homogeneous virtual machines to a target host machine, comprises:

determining whether an application in the homogeneous virtual machines has a high availability requirement; and migrating, in response to determining that the application in the homogeneous virtual machines has the high availability requirement, the virtual machines each with the number of the content-identical memory pages exceeding the preset threshold in the homogeneous virtual machines to different target host machines.

3. The method according to claim 2, wherein migrating, in response to determining that the application in the homogeneous virtual machines has the high availability requirement, the virtual machines each with the number of the content-identical memory pages exceeding the preset threshold in the homogeneous virtual machines to different target host machines, comprises:

determining, in response to determining that the application in the homogeneous virtual machines has the high availability requirement, a high availability level of the high availability requirement;

determining a number of target host machines based on the high availability level; and migrating the virtual machines each with the number of the content-identical memory pages exceeding the preset threshold in the homogeneous virtual machines to the determined number of target host machines.

4. The method according to claim 2, wherein performing memory compression on the homogeneous virtual machines on the target host machine to enable memory sharing of the homogeneous virtual machines for the content-identical memory pages, comprises:

performing the memory compression on homogeneous virtual machines on the same target host machine to enable the memory sharing of the homogeneous virtual machines for the content-identical memory pages.

5. The method according to claim 1, wherein the method further comprises:

in response to determining that the memory compressed by the memory compression operation does not exceed the compression threshold, migrating, from among the virtual machines each with the number of the content-identical memory pages exceeding the preset threshold, the virtual machines corresponding to the content-identical memory pages conforming to the first preset attribute and virtual machines corresponding to content-identical memory pages conforming to a second preset attribute to the target host machine.

6. The method according to claim 1, wherein the monitoring virtual machines in a virtual machine set, and determining homogeneous virtual machines in the virtual machine set, comprises:

determining, based on a hash comparing algorithm, the homogeneous virtual machines having the content-identical memory pages in the virtual machine set, and a number of the content-identical memory pages in each homogeneous virtual machine.

7. The method according to claim 1, wherein, before the monitoring virtual machines in a virtual machine set, and determining homogeneous virtual machines in the virtual machine set, the method further comprises:

determining a state of a configuration switch representing whether memory sharing is to be performed; and the monitoring virtual machines in a virtual machine set, and determining homogeneous virtual machines in the virtual machine set, comprises:

monitoring, in response to determining that the configuration switch is in an on state, the virtual machines in the virtual machine set, and determining the homogeneous virtual machines in the virtual machine set.

8. An apparatus for sharing a memory for virtual machines, the apparatus comprising:

at least one processor; and a memory storing instructions, wherein the instructions when executed by the at least one processor, cause the at least one processor to perform operations, the operations comprising:

monitoring virtual machines in a virtual machine set, and determining homogeneous virtual machines in the virtual machine set, wherein the homogeneous virtual machines are used for representing virtual machines having content-identical memory pages;

migrating virtual machines each with a number of the content-identical memory pages exceeding a preset threshold in the homogeneous virtual machines to a target host machine, comprising:

determining, in the virtual machines each with the number of the content-identical memory pages exceeding the preset threshold, whether a memory compressed by a memory compression operation for content-identical memory pages conforming to a first preset attribute exceeds a compression threshold, wherein the compression threshold represents a minimum expected value for memory compression; and in response to determining that the memory compressed by the memory compression operation exceeds the compression threshold, migrating, from among the virtual machines each with the number of the content-identical memory pages exceeding the preset threshold, virtual machines corresponding to the content-identical memory pages conforming to the first preset attribute to the target host machine; and performing memory compression on the homogeneous virtual machines on the target host machine to enable memory sharing of the homogeneous virtual machines for the content-identical memory pages.

9. The apparatus according to claim 8, wherein migrating virtual machines each with the number of the content-identical memory pages exceeding a preset threshold in the homogeneous virtual machines to a target host machine, comprises:

determining whether an application in the homogeneous virtual machines has a high availability requirement; and migrating, in response to determining that the application in the homogeneous virtual machines has the high availability requirement, the virtual machines each with the number of the content-identical memory pages exceeding the preset threshold in the homogeneous virtual machines to different target host machines.

10. The apparatus according to claim 9, wherein migrating, in response to determining that the application in the homogeneous virtual machines has the high availability requirement, the virtual machines each with the number of the content-identical memory pages exceeding the preset threshold in the homogeneous virtual machines to different target host machines, comprises:

determining, in response to determining that the application in the homogeneous virtual machines has the high availability requirement, a high availability level of the high availability requirement; determining a number of the target host machines based on the high availability level; and migrating the virtual machines each with the number of the content-identical memory pages exceeding the preset threshold in the homogeneous virtual machines to the determined number of target host machines.

11. The apparatus according to claim 9, wherein performing memory compression on the homogeneous virtual machines on the target host machine to enable memory sharing of the homogeneous virtual machines for the content-identical memory pages, comprises:

performing the memory compression on homogeneous virtual machines on the same target host machine to enable the memory sharing of the homogeneous virtual machines for the content-identical memory pages.

12. The apparatus according to claim 8, wherein the operations further comprise:

in response to determining that the memory compressed by the memory compression operation does not exceed the compression threshold, migrating, from among the virtual machines each with the number of the content-identical memory pages exceeding the preset threshold, the virtual machines corresponding to the content-identical memory pages conforming to the first preset attribute and virtual machines corresponding to content-identical memory pages conforming to a second preset attribute to the target host machine.

13. The apparatus according to claim 8, wherein the monitoring virtual machines in a virtual machine set, and determining homogeneous virtual machines in the virtual machine set, comprises:

determining, based on a hash comparing algorithm, the homogeneous virtual machines having the content-identical memory pages in the virtual machine set, and a number of the content-identical memory pages in each homogeneous virtual machine.

14. The apparatus according to claim 8, wherein before the monitoring virtual machines in a virtual machine set, and determining homogeneous virtual machines in the virtual machine set, the operations further comprise:

determining a state of a configuration switch representing whether memory sharing is to be performed; and the monitoring virtual machines in a virtual machine set, and determining homogeneous virtual machines in the virtual machine set, comprises:

monitoring, in response to determining that the configuration switch is in an on state, the virtual machines in the virtual machine set, and determining the homogeneous virtual machines in the virtual machine set.

15. A non-transitory computer readable medium, storing a computer program thereon, the program, when executed by a processor, implements operations comprising:

monitoring virtual machines in a virtual machine set, and determining homogeneous virtual machines in the virtual machine set, wherein the homogeneous virtual machines are used for representing virtual machines having content-identical memory pages;

migrating virtual machines each with a number of the content-identical memory pages exceeding a preset threshold in the homogeneous virtual machines to a target host machine, comprising:

determining, in the virtual machines each with the number of the content-identical memory pages exceeding the preset threshold, whether a memory compressed by a memory compression operation for content-identical memory pages conforming to a first preset attribute exceeds a compression threshold, wherein the compression threshold represents a minimum expected value for memory compression; and in response to determining that the memory compressed by the memory compression operation exceeds the compression threshold, migrating, from among the virtual machines each with the number of the content-identical memory pages exceeding the preset threshold, virtual machines corresponding to the content-identical memory pages conforming to the first preset attribute to the target host machine; and performing memory compression on the homogeneous virtual machines on the target host machine to enable memory sharing of the homogeneous virtual machines for the content-identical memory pages.

16. The non-transitory computer readable medium of claim 15, wherein migrating virtual machines each with the number of the content-identical memory pages exceeding a preset threshold in the homogeneous virtual machines to a target host machine, comprises:

determining whether an application in the homogeneous virtual machines has a high availability requirement; and migrating, in response to determining that the application in the homogeneous virtual machines has the high availability requirement, the virtual machines each with the number of the content-identical memory pages exceeding the preset threshold in the homogeneous virtual machines to different target host machines.

17. The non-transitory computer readable medium of claim 16, wherein migrating, in response to determining that the application in the homogeneous virtual machines has the high availability requirement, the virtual machines each with the number of the content-identical memory pages exceeding the preset threshold in the homogeneous virtual machines to different target host machines, comprises:

determining, in response to determining that the application in the homogeneous virtual machines has the high availability requirement, a high availability level of the high availability requirement;

determining a number of target host machines based on the high availability level; and migrating the virtual machines each with the number of the content-identical memory pages exceeding the preset threshold in the homogeneous virtual machines to the determined number of target host machines.

18. The non-transitory computer readable medium of claim 16, wherein performing memory compression on the homogeneous virtual machines on the target host machine to enable memory sharing of the homogeneous virtual machines for the content-identical memory pages, comprises:

performing the memory compression on homogeneous virtual machines on the same target host machine to enable the memory sharing of the homogeneous virtual machines for the content-identical memory pages.

* * * * *